(12) United States Patent
Omata

(10) Patent No.: US 10,225,418 B2
(45) Date of Patent: Mar. 5, 2019

(54) IMAGE FORMING APPARATUS, DISPLAY CONTROL METHOD, AND STORAGE MEDIUM FOR DISPLAYING AN IMAGE BASED ON A TOUCH OPERATION

(71) Applicant: CANON KABUSHIKI KAISHA, Tokyo (JP)

(72) Inventor: Jun Omata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/689,936

(22) Filed: Aug. 29, 2017

(65) Prior Publication Data

US 2017/0359474 A1    Dec. 14, 2017

Related U.S. Application Data

(63) Continuation of application No. 14/660,744, filed on Mar. 17, 2015, now Pat. No. 9,787,864.

(30) Foreign Application Priority Data

Mar. 18, 2014   (JP) ................................ 2014-055351

(51) Int. Cl.
*H04N 1/00* (2006.01)
*G06F 3/0488* (2013.01)
(Continued)

(52) U.S. Cl.
CPC ....... *H04N 1/00411* (2013.01); *G06F 3/0484* (2013.01); *G06F 3/0486* (2013.01); *G06F 3/0488* (2013.01); *G06F 3/04883* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

2008/0030818 A1    2/2008  Nagahara et al.
2012/0075670 A1*   3/2012  Yamaguchi ........ H04N 1/00411
                                                     358/1.15
(Continued)

FOREIGN PATENT DOCUMENTS

CN    102572165 A    7/2012
CN    103034427 A    4/2013
(Continued)

*Primary Examiner* — Andrew H Lam
(74) *Attorney, Agent, or Firm* — Canon USA, Inc., IP Division

(57) ABSTRACT

An image forming apparatus having a touch panel and capable of smoothly displaying an image even though the image forming apparatus has scarce hardware resources. The image forming apparatus includes an operation unit provided with a touch panel configured to display a screen sequentially shifted by an operation of a user, determines a type of operations such as a flick and a drag executed on the touch panel by the user, and displays a screen on the touch panel by shifting the screen by N-screens (N is an integer of two or more) if the operation is the flick while displaying a screen on the touch panel by shifting the screen by one screen if the operation is the drag.

12 Claims, 13 Drawing Sheets

(51) Int. Cl.
G06F 3/0486 (2013.01)
G06F 3/0484 (2013.01)

(56) References Cited

U.S. PATENT DOCUMENTS

| | | |
|---|---|---|
| 2013/0120289 A1 | 5/2013 | Seto |
| 2014/0078113 A1* | 3/2014 | Yamauchi ............ G06F 3/0418 345/178 |
| 2014/0149923 A1 | 5/2014 | Horiike |

FOREIGN PATENT DOCUMENTS

| | | |
|---|---|---|
| CN | 103440107 A | 12/2013 |
| JP | 2006-109392 A | 4/2006 |
| JP | 2006-302184 A | 11/2006 |
| JP | 2012-070346 A | 4/2012 |
| JP | 2013-105461 A | 5/2013 |
| JP | 2015-114978 A | 6/2015 |
| WO | 2008/035489 A1 | 3/2008 |

* cited by examiner

FIG. 6

PLEASE SELECT ADDRESS

NUMBER OF ADDRESSES: 1/3

1234567890**5678

RECEIVING MODE: AUTOMATIC RECEIVING MODE

RESOLUTION: 200×100dpi (✓···)

DENSITY: ±0

12345678901234

12345678901234

PLEASE SELECT ADDRESS

NUMBER OF ADDRESSES: 2/3

9876543210 9854

RECEIVING MODE: AUTOMATIC RECEIVING MODE

RESOLUTION: 200×100dpi (✓···)

DENSITY: ±0

12345678901234

12345678901234

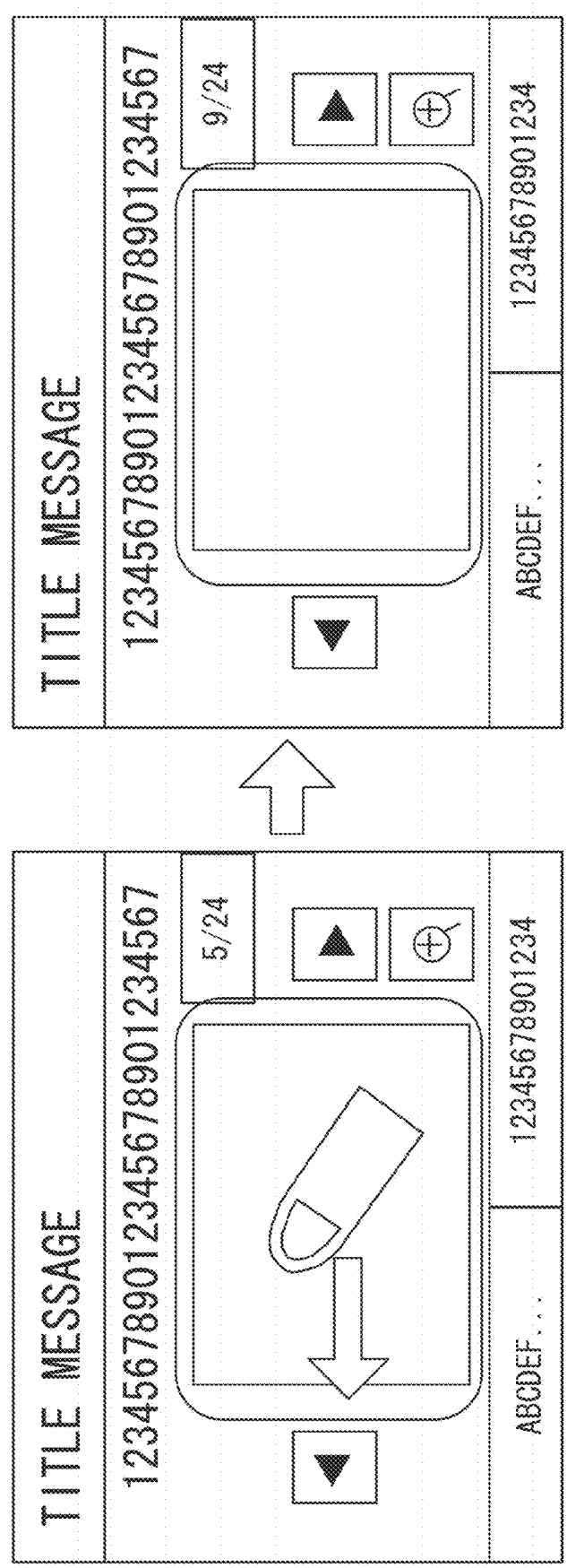

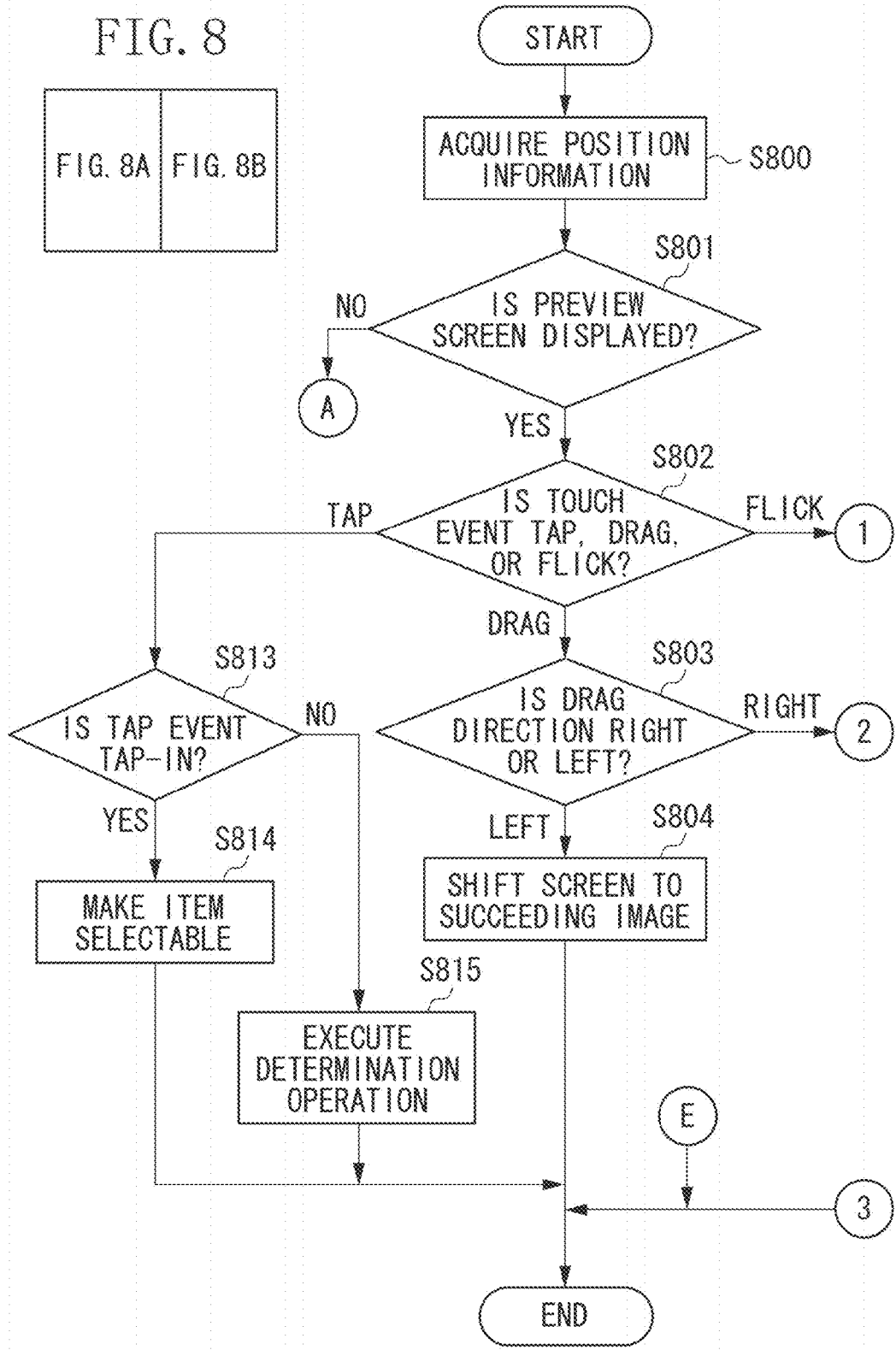

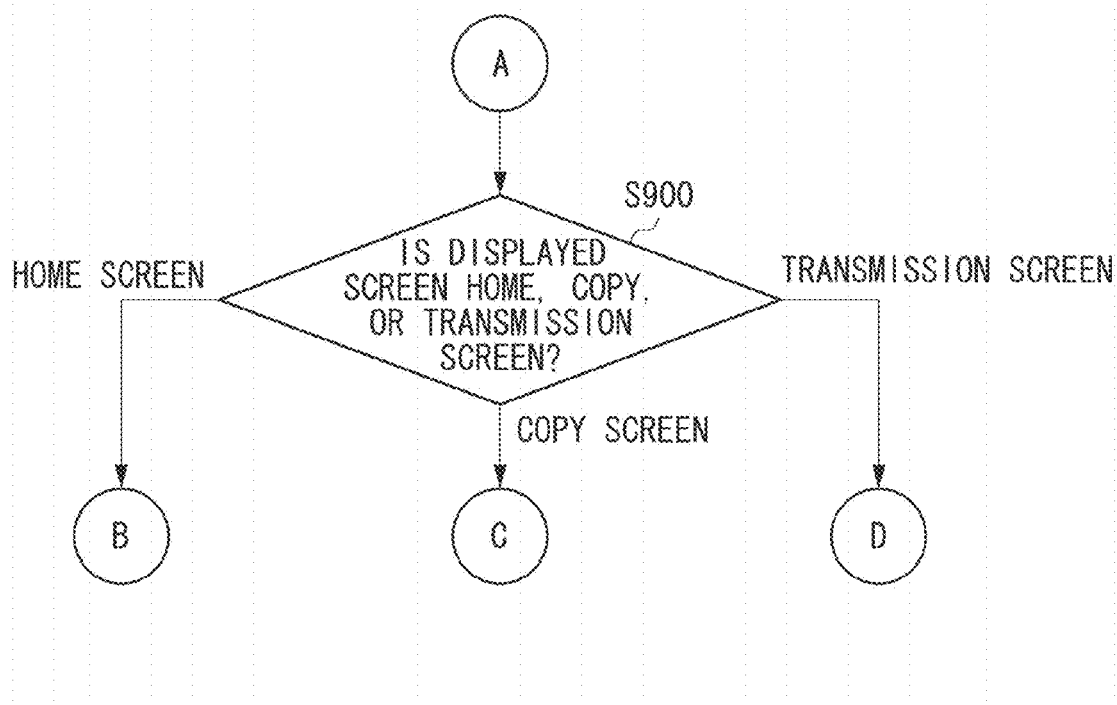

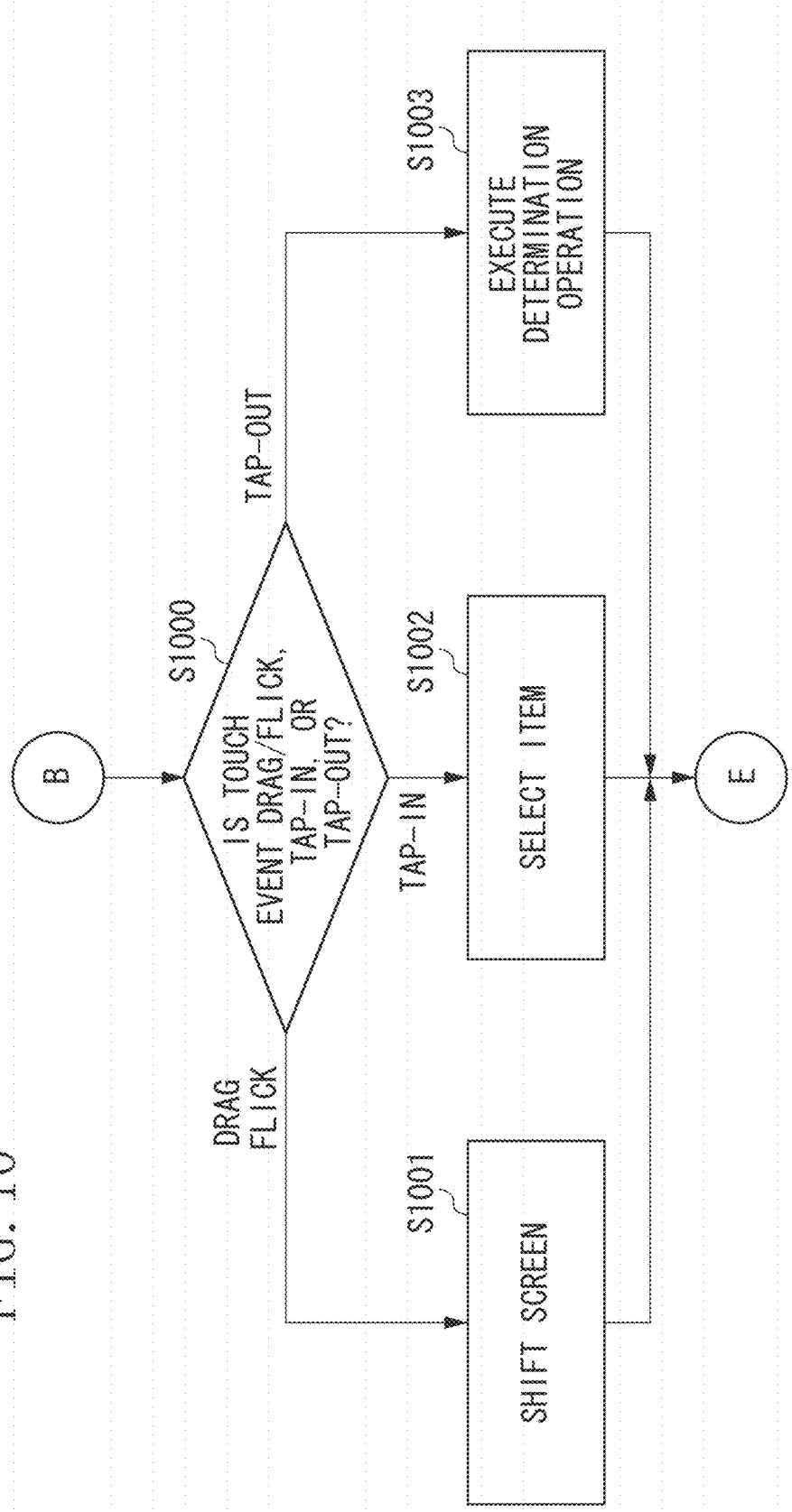

IMAGE FORMING APPARATUS, DISPLAY CONTROL METHOD, AND STORAGE MEDIUM FOR DISPLAYING AN IMAGE BASED ON A TOUCH OPERATION

CROSS-REFERENCE TO RELATED APPLICATIONS

This application is a Continuation of U.S. application Ser. No. 14/660,744, filed Mar. 17, 2015, which claims the benefit of priority from Japanese Patent Application No. 2014-055351 filed Mar. 18, 2014, each of which are hereby incorporated by reference herein in their entireties.

BACKGROUND OF THE INVENTION

Field of the Invention

The present generally relates to image forming and to a touch panel employed for a user interface of an image forming apparatus such as a copying machine or a multifunction peripheral, and, more particularly, to an image forming apparatus, a display control method, a storage medium.

Description of the Related Art

Generally, there is provided an image forming apparatus including a touch panel as a user interface. A touch panel has been conventionally employed for a high-end model having a large size screen. However, in recent years, the touch panel has been also employed for a low-end model having a small size screen. Because the low-end model has scarce hardware resources in comparison to the high-end model, an image that is to be displayed on the touch panel has to be controlled by a method different from a method employed for the high-end model.

The image forming apparatus including a touch panel may have a function for displaying a preview image of a printing-target image file. For example, in order to change the image file for the preview image, the user executes a drag or a flick operation on the touch panel. A preview image displayed on the screen is shifted by changing the image file for the preview image. Japanese Patent Application Laid-Open No. 2006-302184 discusses a technique in which a screen is shifted based on a moving direction and a moving amount of a sweeping operation with respect to a touch panel executed by a user.

According to the technique discussed in Japanese Patent Application Laid-Open No. 2006-302184, because the screen is shifted according to the moving amount of the sweeping operation with respect to the touch panel, the screen has to be updated quickly when the moving amount is large. However, it is difficult for a low-end model having scarce hardware resources to smoothly shift the screen because the image cannot be rasterized in time. Therefore, it is necessary to provide a technique for enabling the low-end model having scarce hardware resources to display the image smoothly.

SUMMARY OF THE INVENTION

The present disclosure is directed to an information processing apparatus capable of smoothly displaying an image even if the information processing apparatus has scarce hardware resources.

According to an aspect of the present disclosure, an information processing apparatus includes a display unit configured to display an image, a detection unit configured to detect a touch operation executed on the image displayed on the display unit, and a display control unit configured to shift the image displayed on the display unit to an image preceding or succeeding a currently-displayed image by N-images without executing intermediate depiction when a flick operation is detected by the detection unit, wherein N is an integer of two or more.

Further features of the present disclosure will become apparent from the following description of exemplary embodiments with reference to the attached drawings.

BRIEF DESCRIPTION OF THE DRAWINGS

FIG. 6 is an explanatory diagram illustrating transitions of screens caused by the flick and the drag operations.

FIG. 7 is an explanatory diagram illustrating transitions of screens caused by the flick and the drag operations.

FIG. 9 is a flowchart illustrating shifting processing of a screen.

FIG. 10 is a flowchart illustrating shifting processing of a screen.

DESCRIPTION OF THE EMBODIMENTS

Hereinafter, an exemplary embodiment of the present disclosure will be described in detail with reference to the appended drawings.

Figure 1:
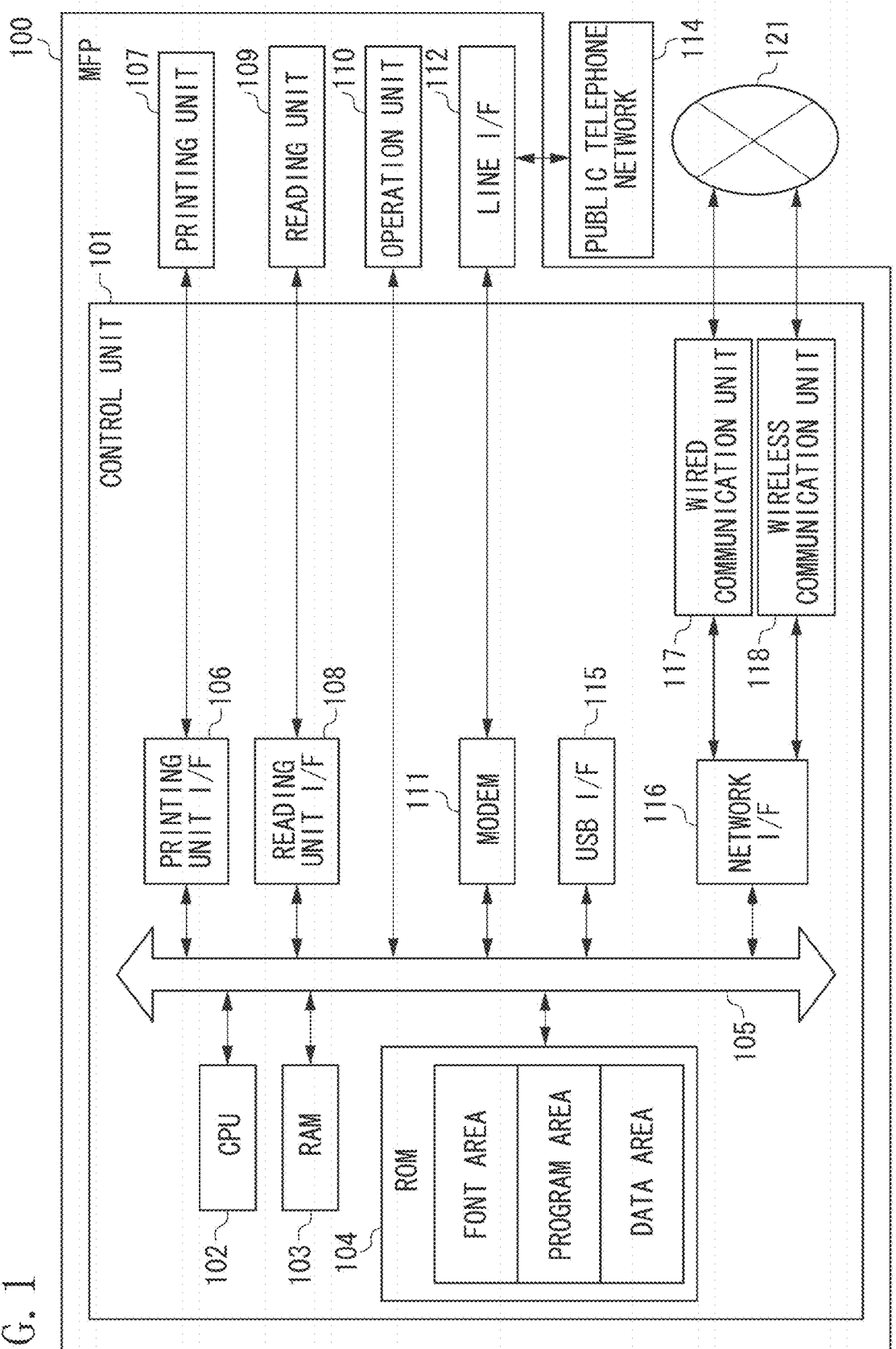
FIG. 1 is a block diagram illustrating a hardware configuration of a multifunction peripheral (MFP).

FIG. 1 is a block diagram illustrating a hardware configuration of a multifunction peripheral (MFP) 100 as an example of an image forming apparatus. The MFP 100 includes a control unit 101, a printing unit 107, a reading unit 109, an operation unit 110, and a line interface (I/F) 112. The control unit 101 controls operations of the entire MFP 100. The printing unit 107 executes image forming processing based on an image file to form an image on a sheet. The reading unit 109 reads an image from a document. The operation unit 110 is a user interface integrally configured of a display unit for displaying an image and an input unit for receiving an instruction from a user. The line I/F 112 is a communication interface allowing the MFP 100 to communicate with other devices via a public telephone network 114. The MFP 100 is a type of information processing apparatus communicable with other devices, and can execute image forming processing by controlling the operations of the printing unit 107 and the reading unit 109. As used herein, the term "unit" generally refers to any combination of software, firmware, hardware, or other component, such as circuitry, that is used to effectuate a purpose.

The control unit 101 includes a central processing unit (CPU) 102 for controlling the operation of the MFP 100 by controlling the operations of constituent elements within the control unit 101. In order to control the operations, the CPU 102 reads a computer program stored in a program area of a read only memory (ROM) 104 to execute the computer program by using a random access memory (RAM) 103 as a work area. In addition to the program area, the ROM 104 includes a font area for storing fonts of an image displayed on a display unit of the operation unit 110 and a data area for storing apparatus information of the MFP 100, address book information of the user, department management information, and image files. The CPU 102 may be configured to read the computer program from a large-capacity storage unit (not illustrated).

The control unit 101 further includes a printing unit I/F 106, a reading unit I/F 108, a modem 111, a universal serial bus (USB) I/F 115, a network I/F 116, a wired communication unit 117, and a wireless communication unit 118. Each of these constituent elements within the control unit 101 is communicably connected to each other through a system bus 105.

The printing unit I/F 106 serves as an interface for transmitting/receiving various kinds of data to/from the printing unit 107. The reading unit I/F 108 serves as an interface for transmitting/receiving various kinds of data to/from the reading unit 109. The CPU 102 reads an image from a document by controlling the operation of the reading unit 109 via the reading unit I/F 108, and executes image forming processing of the read image in the image file by controlling the operation of the printing unit 107 via the printing I/F 106.

The modem 111 executes facsimile communication and telephone communication through the public telephone network 114 via the line I/F 112. The USB I/F 115 is an interface to which USB devices can be connected. External memories such as a USB memory and a large-capacity USB storage device are examples of the USB devices connected to the USB I/F 115.

The network I/F 116 serves as an interface for communicating with the network 121 through the wired communication unit 117 and the wireless communication unit 118. The network 121 may be a local area network (LAN), a wide area network (WAN), or the internet.

The MFP 100 can acquire the image file for displaying a preview image from the reading unit 109, the modem 111, the USB I/F 115, the network I/F 116, a data area of the ROM 104, or a large-capacity storage device (not illustrated). The MFP 100 stores the image file acquired from the reading unit 109, the modem 111, or the network I/F 116 in the RAM 103. The MFP 100 acquires the image file for displaying a preview image at each time the MFP 100 executes preview display of the image file acquired from the external memory via the USB I/F 115. The image file is sorted according to the file name or the updated date/time, and stored in the RAM 103, the external memory, the ROM 104, or the large-capacity storage medium. The MFP 100 can sequentially shift the preview image of the image file according to the sorted order.

Figure 2:
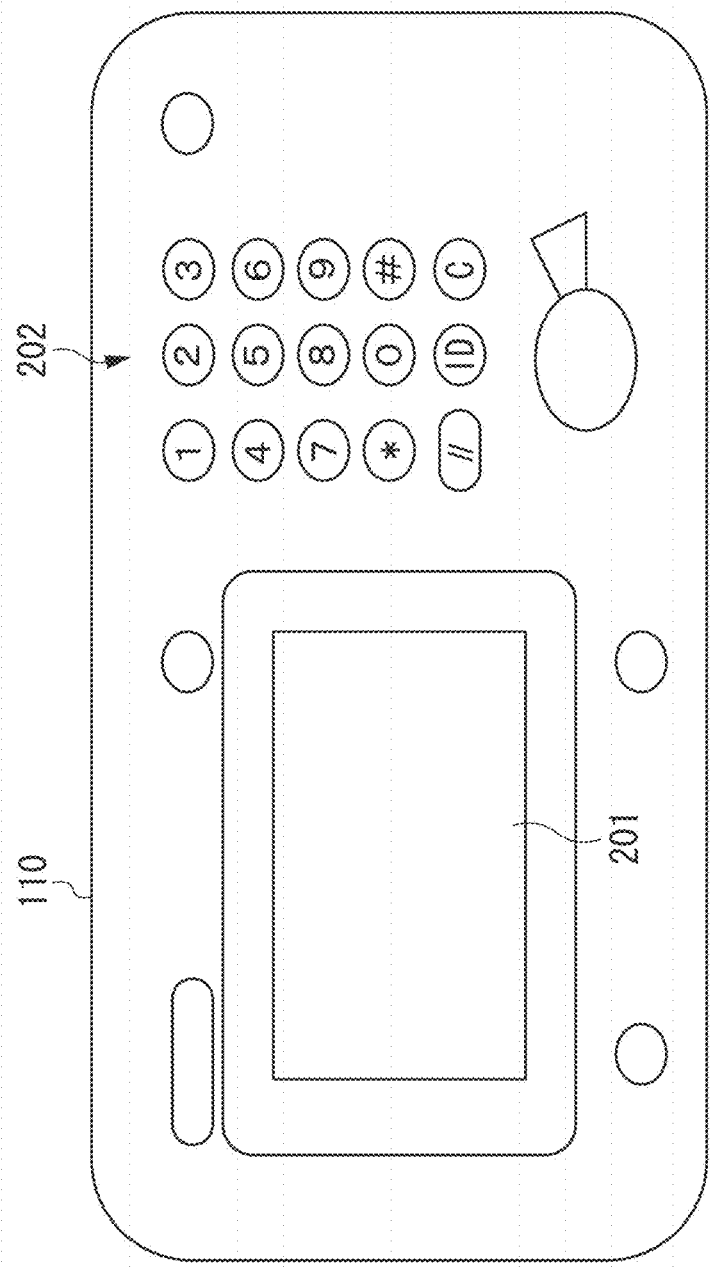
FIG. 2 is a diagram illustrating an example of an external view of an operation unit.

FIG. 2 is a diagram illustrating an example of an external view of the operation unit 110. The operation unit 110 includes a touch panel 201 and hardware keys 202. The touch panel 201 is integrally configured of a display unit and a position input device. The hardware keys 202 are configured of a plurality of operation buttons such as a numerical keypad and a start key. The CPU 102 receives instructions from a user through operations input to the touch panel 201 and the hardware keys 202. In the present exemplary embodiment, the CPU 102 particularly displays an image such as a preview image of the image file on the display unit of the touch panel 201 in addition to displaying a text and a symbol according to font information. The touch panel 201 detects a position where the user's finger or a stylus pen has touched on the touch panel 201. Hereinafter, an operation using a finger or fingers will be described as an example. The CPU 102 acquires the position information indicating the position detected by the touch panel 201 and determines a touch event corresponding to content of the operation executed by the user according to a change in the position information.

Figure 3:
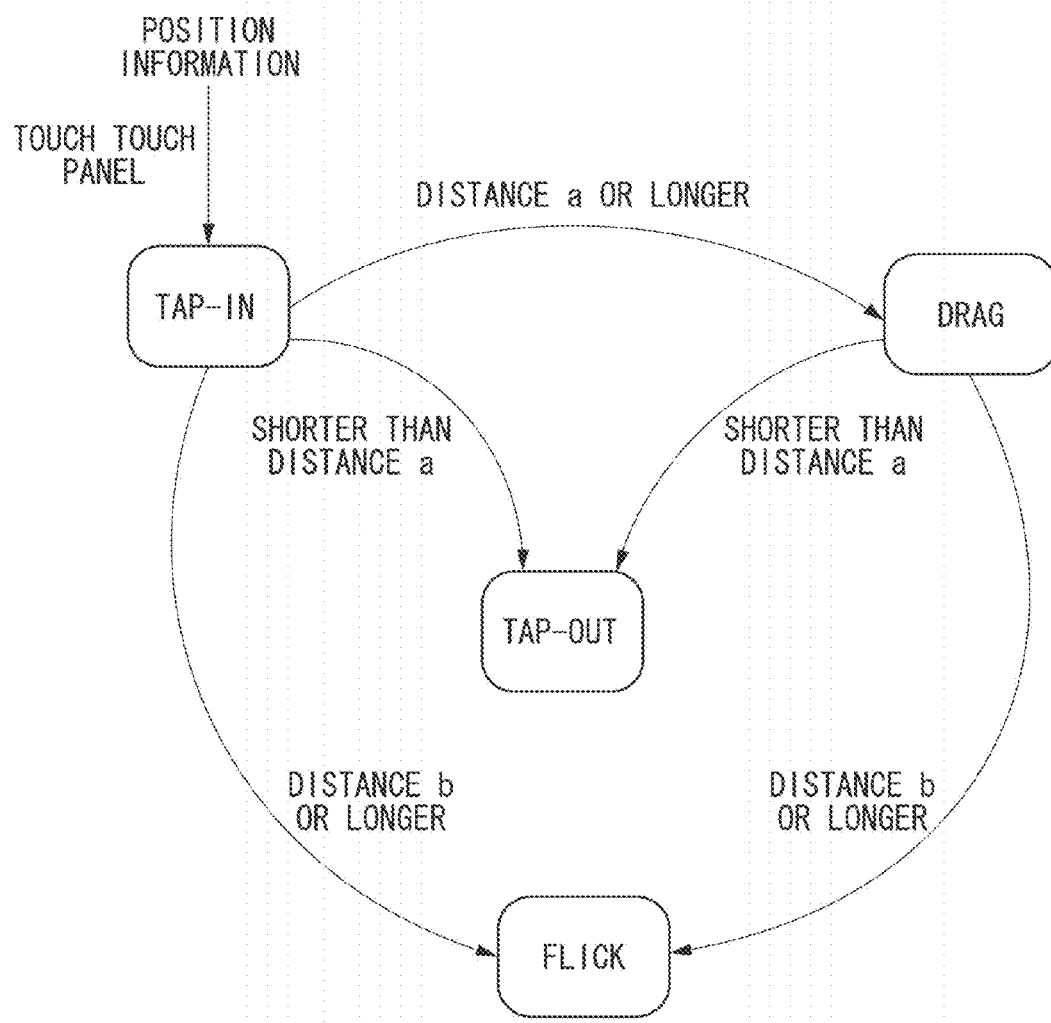
FIG. 3 is an explanatory diagram illustrating a determination criterion of a touch event.

FIG. 3 is an explanatory diagram illustrating a determination criterion of a touch event determined by the CPU 102. The CPU 102 executes processing according to the touch event. Touching the touch panel 201 with a finger is referred to as "tap-in", whereas removing the finger from the touch panel 201 is referred to as "tap-out". Sweeping the touch panel 201 with the finger in a tap-in state is referred to as "flick". Sliding the finger across the touch panel 201 while maintaining the tap-in state is referred to as "drag".

A tap-in event occurs when a user touches the touch panel 201. The CPU 102 determines that a tap-out event has occurred when the user removes the finger from the touch panel 201 after moving the finger by a distance shorter than a distance "a" from the position where the tap-in event has occurred. The CPU 102 determines that a drag event has occurred when the user moves the finger by the distance "a" or longer from the position where the tap-in event has occurred. The CPU 102 determines that a flick event has occurred when the user removes the finger from the touch panel 201 after quickly moving the finger by a distance "b" or longer from the position where the tap-in event has occurred. The CPU 102 determines that the tap-out event has occurred when the user removes the finger from the touch panel 201 after moving the finger by a distance shorter than the distance "a" from the position where the drag event has occurred. The CPU 102 determines that a flick event has occurred when the user removes the finger from the touch panel 201 after moving the finger by the distance "b" or longer from the position where the drag event has occurred. In a case where the flick event has occurred, the CPU 102 determines the sweeping intensity of the finger according to a distance in which the finger has moved before separating from the touch panel 201.

FIGS. 4 to 7 are explanatory diagrams illustrating transitions of screens caused by the flick or the drag operation. A plurality of screens can be displayed on the display unit of the touch panel 201. Herein, four screens displayed on the display unit when the user uses the MFP 100 will be described as examples.

Figure 4:
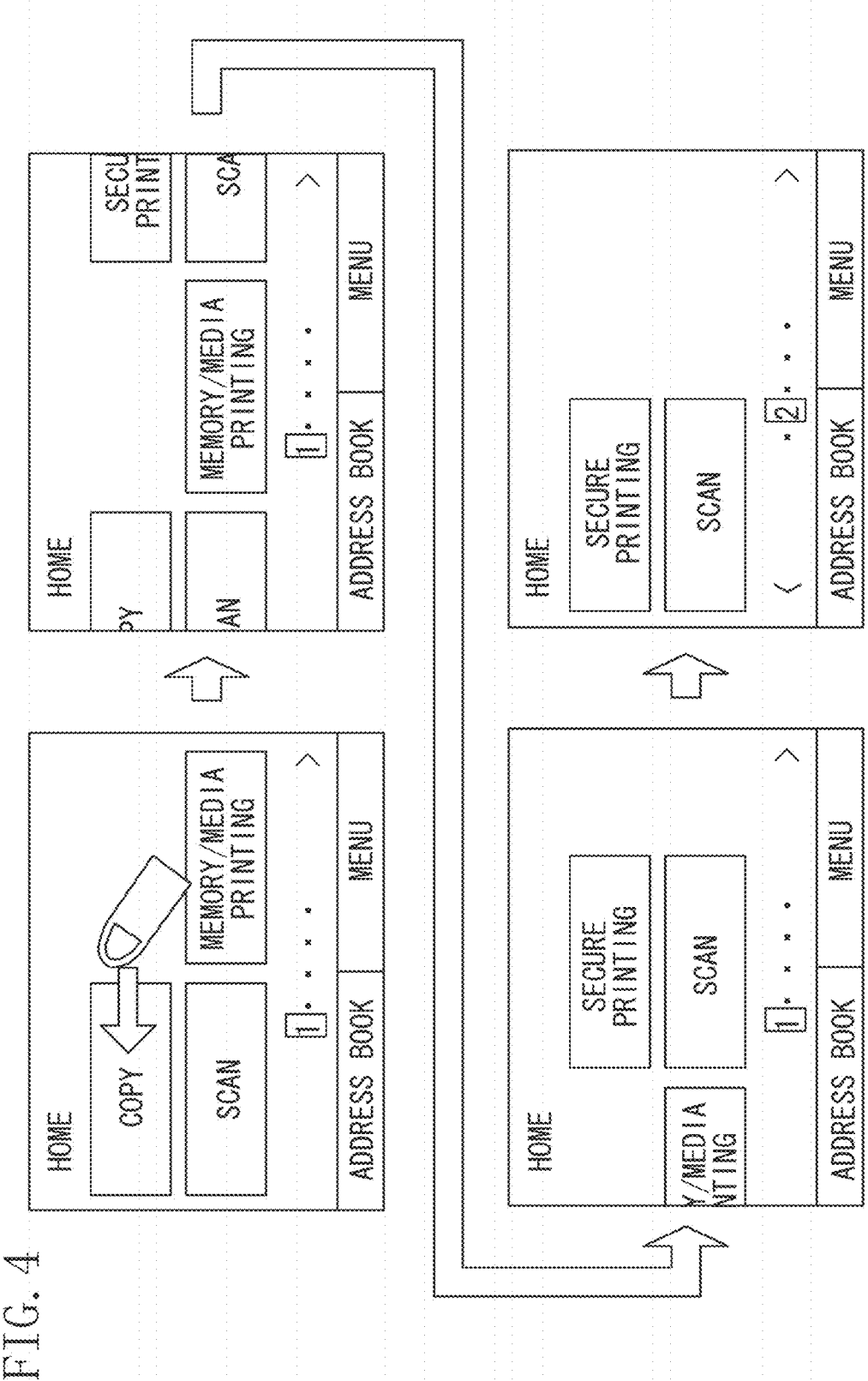
FIG. 4 is an explanatory diagram illustrating transitions of screens caused by a flick and a drag operations.

FIG. 4 is a diagram illustrating operations executed on a home screen for selecting the functions of the MFP 100 such as a copy function and a scanner function. Each of the functions is associated with an icon displayed on the home screen. The user instructs the MFP 100 to execute the function associated with the icon by operating the icon. When the user executes the flick or the drag operation on the touch panel 201 while the home screen is being displayed thereon, the CPU 102 determines that the flick or the drag event has occurred. According to the determination result, the CPU 102 shifts the home screen in a direction of the flick or the drag. As illustrated in FIG. 4, when the screen is to be shifted, a current screen and a transition-destination screen are treated as successive screens, not being treated as pages switched from one to the other. Displaying an in-transition screen of the screens shifted as the successive screens is referred to as "intermediate depiction". In FIG. 4, the screen is shifted from a current screen on the left side to a transition-destination screen on the right side, and displaying the two screens provided between the current and the transition-destination screens correspond to the intermediate depiction.

A shifting amount is fixed regardless of sweeping intensity of the finger in the flick or a moving distance of the finger in the drag. In other words, when the CPU 102 determines that the flick event or the drag event has occurred while the home screen is being displayed, the CPU 102 shifts the current screen to the transition-destination screen through predetermined intermediate depiction. The home screen is configured of a small number of screens while a plurality of icons for selecting the functions is displayed on a single screen. Thus, the icons are hardly viewable if the screen is quickly shifted according to the sweeping intensity of the finger in the flick or the moving distance of the finger in the drag. Therefore, the shift of the screen is limited to from the current screen to the transition-destination screen.

Figure 5:
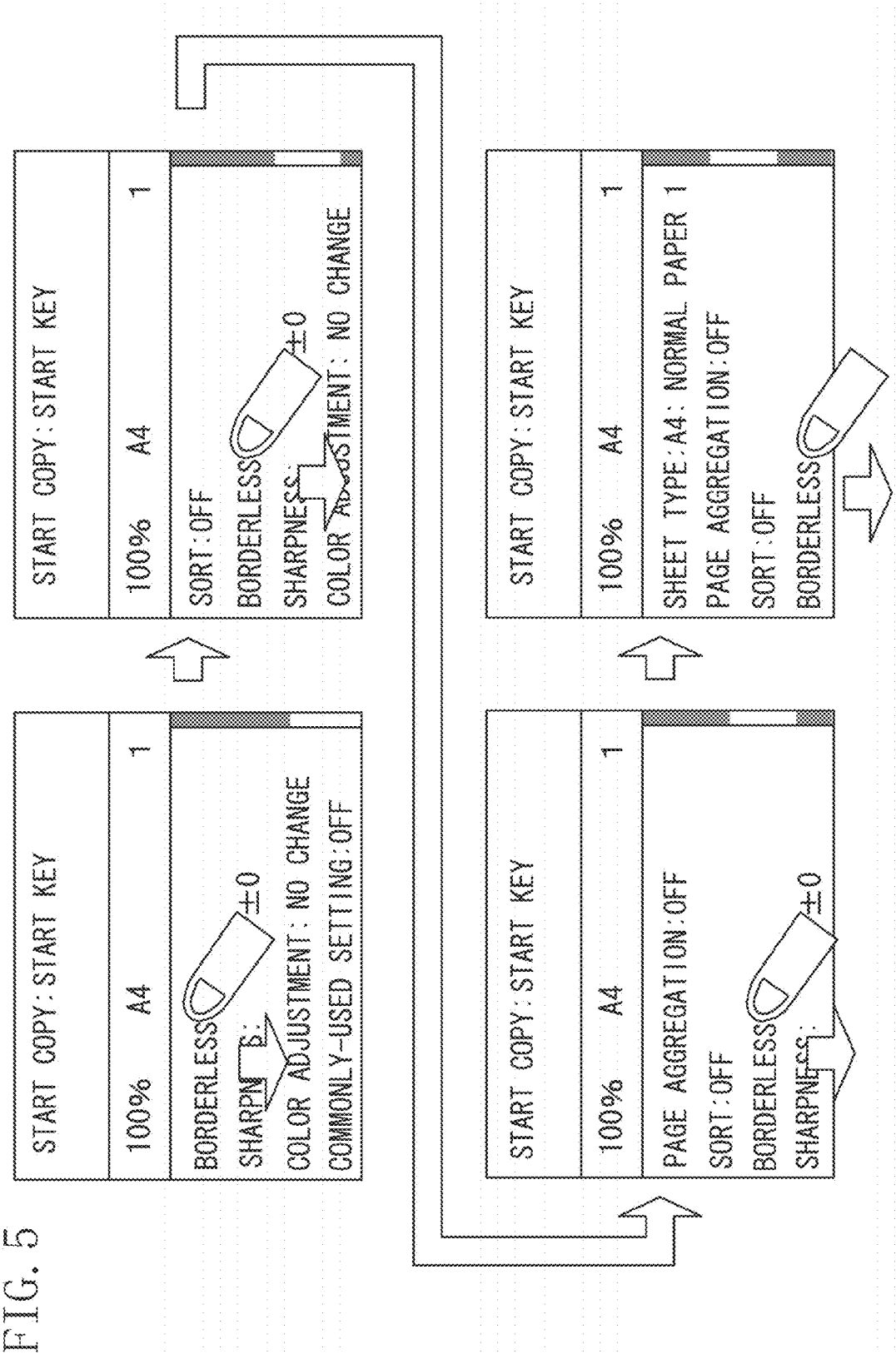
FIG. 5 is an explanatory diagram illustrating transitions of screens caused by the flick and the drag operations.
Figure 8B:
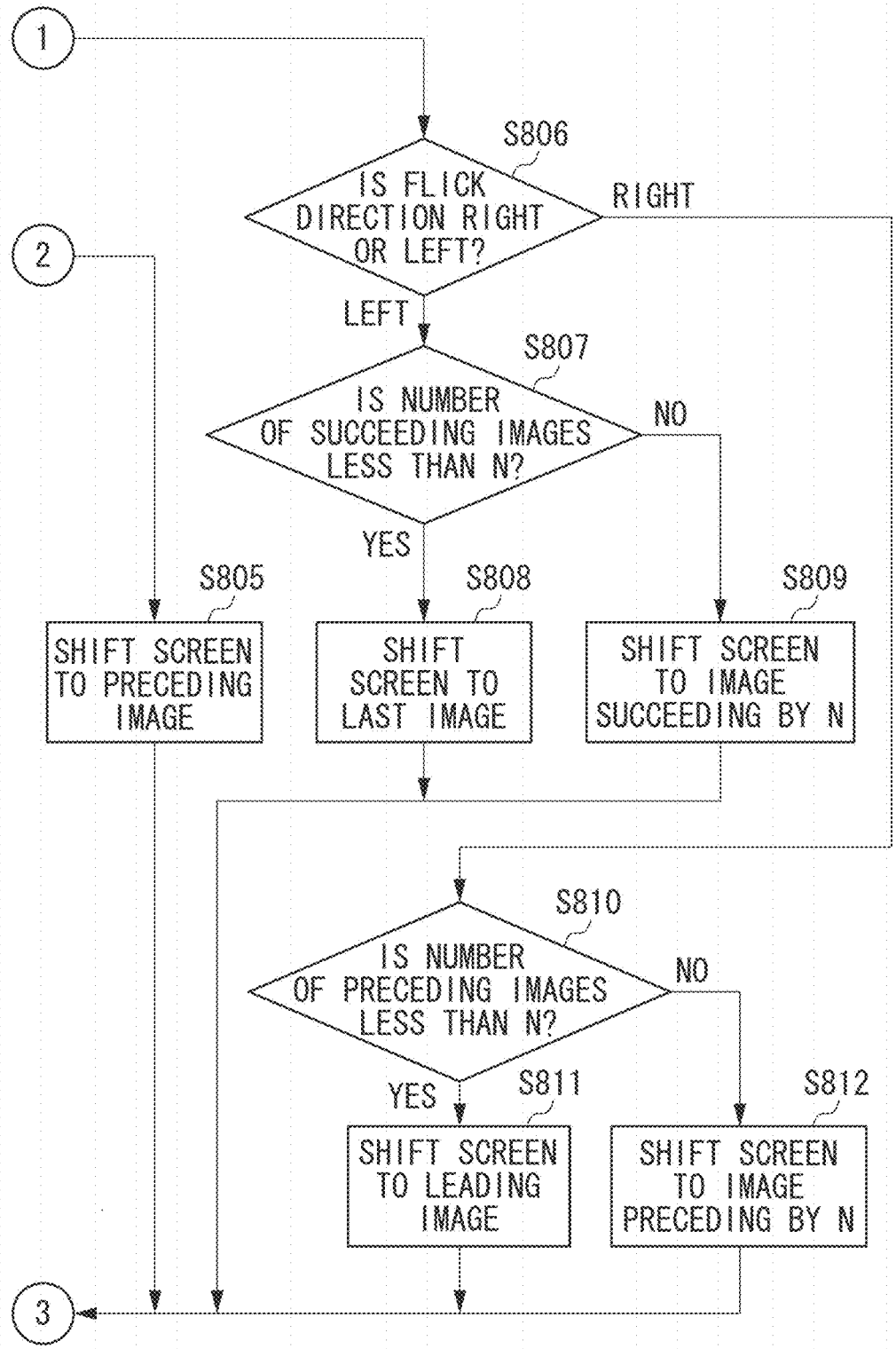
FIG. 8 (consisting of 8A and 8B) is a flowchart illustrating shifting processing of a screen.

FIG. 5 is a diagram illustrating operations executed on a copy screen in a copy operation. A plurality of items for executing various settings of the copy operation is displayed on the copy screen. The items can be moved in a vertical direction by executing the flick or the drag operation. When the user executes the flick or the drag operation on the touch panel 201 while the copy screen is being displayed thereon, the CPU 102 determines that the flick or the drag event has occurred. According to the above determination result, the CPU 102 changes the screen by moving the items in a direction of the flick or the drag. In the flick operation, a plurality of rows of items is moved according to the sweeping intensity of the finger. In the drag operation, the items are moved according to the movement of the finger. Through the above operations, the user can quickly display a desired item.

FIG. 6 is a diagram illustrating operations executed on a transmission screen for performing a facsimile transmission. An area for executing various settings for the facsimile transmission is provided on the transmission screen. When the user executes the flick or the drag operation on the touch panel 201 while the transmission screen is being displayed thereon, the CPU 102 determines that the flick or the drag event has occurred. For example, according to the determination result, the CPU 102 changes the content displayed in an address display area for displaying the address of a transmission destination in a direction of the flick or the drag. The CPU 102 changes the displayed content by simply shifting the address to the next address regardless of the sweeping intensity of the finger in the flick or the moving distance of the finger in the drag. Because the displayed content can be equally changed by the flick and the drag, the user can easily check the transmission destination.

FIG. 7 is a diagram illustrating operations executed on a preview screen for displaying a preview image of the printing-target image file. A preview display area for displaying a preview image is provided on the preview screen. The image file for displaying a preview image is stored in the ROM 104, an external storage device or a large-capacity storage device (not illustrated) connected to the USB I/F 115 or the network 121. When the user executes the flick or the drag operation on the preview display area of the touch panel 201, the CPU 102 determines that the flick or the drag event has occurred. According to the determination result, the CPU 102 changes the image file for displaying the preview image to the next image file.

In the flick operation, the CPU 102 displays a preview image by shifting the screen by five image files. In the drag operation, the CPU 102 displays a preview image by shifting the screen by one image file. Because a page number is displayed on the preview screen, the user can check as to how many preview images have been shifted. In addition, when the screen is shifted by five image files, a preview image of each image file in a transition state may be displayed temporarily. With this configuration, the user can confirm that the image has been shifted.

FIGS. 8 to 12 are flowcharts illustrating display control processing for shifting a screen displayed on the touch panel 201 executed in the touch event.

In step S800, when the user touches the touch panel 201, the CPU 102 acquires position information indicating a touched position from the operation unit 110. After acquiring the position information, in step S801, the CPU 201 checks whether a screen currently displayed on the touch panel 201 is a preview screen. In a case where the screen is not a preview screen (see FIG. 7) (NO in step S801), the processing proceeds to processing A illustrated in FIG. 9. The processing A will be described below.

In a case where the screen is a preview screen (YES in step S801), the processing proceeds to step S802. In step S802, the CPU 102 determines a type of the touch event. The CPU 102 determines the type of the touch event based on the determination criterion illustrated in FIG. 3.

In a case where the touch event is a drag event ("DRAG" in step S802), the processing proceeds to step S803. In step S803, the CPU 102 determines a moving direction of the finger in the drag event. In a case where the finger is moved to the left ("LEFT" in step S803), the processing proceeds to step S804. In step S804, the CPU 102 executes preview display by shifting the image file from the image file of the currently-displayed preview image to a succeeding image file in the sorted order. In a case where the finger is moved to the right ("RIGHT" in step S803), the processing proceeds to step S805. In step S805, the CPU 102 executes preview display by shifting the image file from the image file of the currently-displayed preview image to a preceding image file in the sorted order. After shifting the preview image, the CPU 102 ends the processing. The CPU 102 does not execute intermediate depiction while the preview image is being shifted.

In a case where the touch event is a flick event ("FLICK" in step S802), the processing proceeds to step S806. In step S806, the CPU 102 determines a moving direction of the finger in the flick event. In a case where the finger is moved to the left ("LEFT" in step S806), the processing proceeds to step S807. In step S807, the CPU 102 determines whether the number of image files succeeding the image file of the currently-displayed preview image is less than N (N is an integer of 2 or more) in the sorted order. In a case where the number of succeeding image files is less than N (YES in step S807), the processing proceeds to step S808. In step S808, the CPU 102 executes preview display by shifting the image file from the image file of the currently-displayed preview image to a last image file in the sorted order. In a case where the number of succeeding image files is N or more (NO in step S807), the processing proceeds to step S809. In step S809, the CPU 102 executes preview display by shifting the image file from the image file of the currently-displayed preview image to an image file succeeding by N in the sorted order. After shifting the preview image, the CPU 102 ends the processing. The CPU 102 does not execute intermediate depiction while the above preview image is being shifted.

In a case where the touch event is the flick event and the finger is moved to the right ("RIGHT" in step S806), the processing proceeds to step S810. In step S810, the CPU 102 determines whether the number of image files that precedes the image file of the currently-displayed preview image is less than N in the sorted order. In a case where the number of preceding image files is less than N (YES in step S810), the processing proceeds to step S811. In step S811, the CPU 102 executes preview display by shifting the image file from the image file of the currently-displayed preview image to a leading image file in the sorted order. In a case where the number of preceding image files is N or more (NO in step S810), the processing proceeds to step S812. In step S812, the CPU 102 executes preview display by shifting the image file from the image file of the currently-displayed preview image to an image file preceding by N in the sorted order. After shifting the preview image, the CPU 102 ends the processing. The CPU 102 does not execute intermediate depiction while the above preview image is being shifted.

In a case where the touch event is the tap event ("TAP" in step S802), the processing proceeds to step S813. In step S813, the CPU 102 determines whether the tap event is a tap-in. In a case where the tap event is a tap-in (YES in step S813), the processing proceeds to step S814. In step S814, the CPU 102 causes the item displayed on a tap-in position to be a selected state, and ends the processing. In a case where the tap event is the tap-out (NO in step S813), the processing proceeds to step S815. In step S815, the CPU 102 executes an operation for determining the item displayed on a tap-out position, and ends the processing.

As described above, in a case where the user executes the flick operation while the preview screen is being displayed, the MFP 100 executes preview display by shifting the image file by N according to the direction of the flick. Further, in a case where the user executes the drag operation while the preview screen is being displayed, the MFP 100 executes the preview display by shifting the image file by one according to the direction of the drag. In addition, in a case where the flick operation is executed while the preview screen is being displayed, the number of image files to be shifted may be changed according to the intensity of the flick.

In a case where the screen displayed on the touch panel 201 is not the preview screen in step S801, in step S900, the CPU 102 determines the currently-displayed screen as illustrated in the processing A in FIG. 9.

In a case where the currently-displayed screen is the home screen (see FIG. 4) ("HOME SCREEN" in step S900), the processing proceeds to step S1000 of processing B. In step S1000, as illustrated in FIG. 10, the CPU 102 determines the type of the touch event according to the determination criterion illustrated in FIG. 3.

In a case where the touch event is the drag event or the flick event ("DRAG/FLICK" in step S1000), the processing proceeds to step S1001. In step S1001, the CPU 102 determines the moving direction of the finger in the drag event or the flick event and shifts the screen in that direction. The CPU 102 executes intermediate depiction while the screen is being shifted. In a case where the touch event is the tap-in event ("TAP-IN" in step S1000), the processing proceeds to step S1002. In step S1002, the CPU 102 causes the item displayed on a tap-in position to be a selected state, and ends the processing. In a case where the touch event is the tap-out event ("TAP-OUT" in step S1000), the processing proceeds to step S1003. In step S1003, the CPU 102 executes the determination operation of the item to be displayed on the tap-out position and ends the processing.

Figure 11:
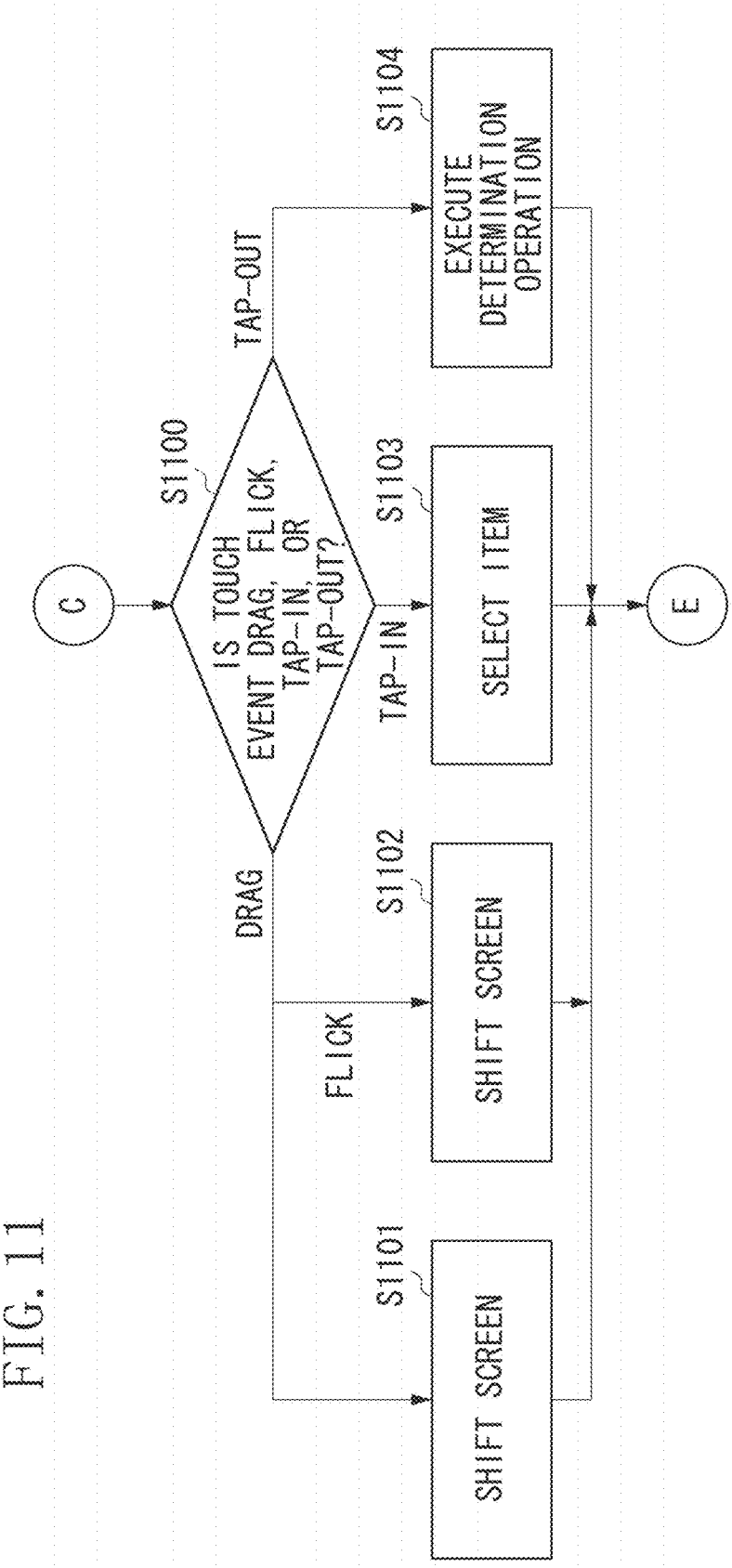
FIG. 11 is a flowchart illustrating shifting processing of a screen.

In a case where the currently-displayed screen is the copy screen (see FIG. 5) ("COPY SCREEN" in step S900), the processing proceeds to step S1100 of processing C in FIG. 11. In step S1100, as illustrated in FIG. 11, the CPU 102 determines the type of the touch event according to the determination criterion illustrated in FIG. 3.

In a case where the touch event is the drag event ("DRAG" in step S1100), the processing proceeds to step S1101. In step S1101, the CPU 102 shifts the screen while executing intermediate depiction following the movement of the finger in the drag event. In a case where the touch event is the flick event ("FLICK" in step S1100), the processing proceeds to step S1102. In step S1102, the CPU 102 shifts the screen while executing intermediate depiction according to the moving amount of the finger in the flick event.

In a case where the touch event is the tap-in event ("TAP-IN" in step S1100), the processing proceeds to step S1103. In step S1103, the CPU 102 causes the item displayed on a tap-in position to be a selected state, and ends the processing. In a case where the touch event is the tap-out event ("TAP-OUT" in step S1100), the processing proceeds to step S1104. In step S1104, the CPU 102 executes the determination operation of the item to be displayed on a tap-out position, and ends the processing.

Figure 12:
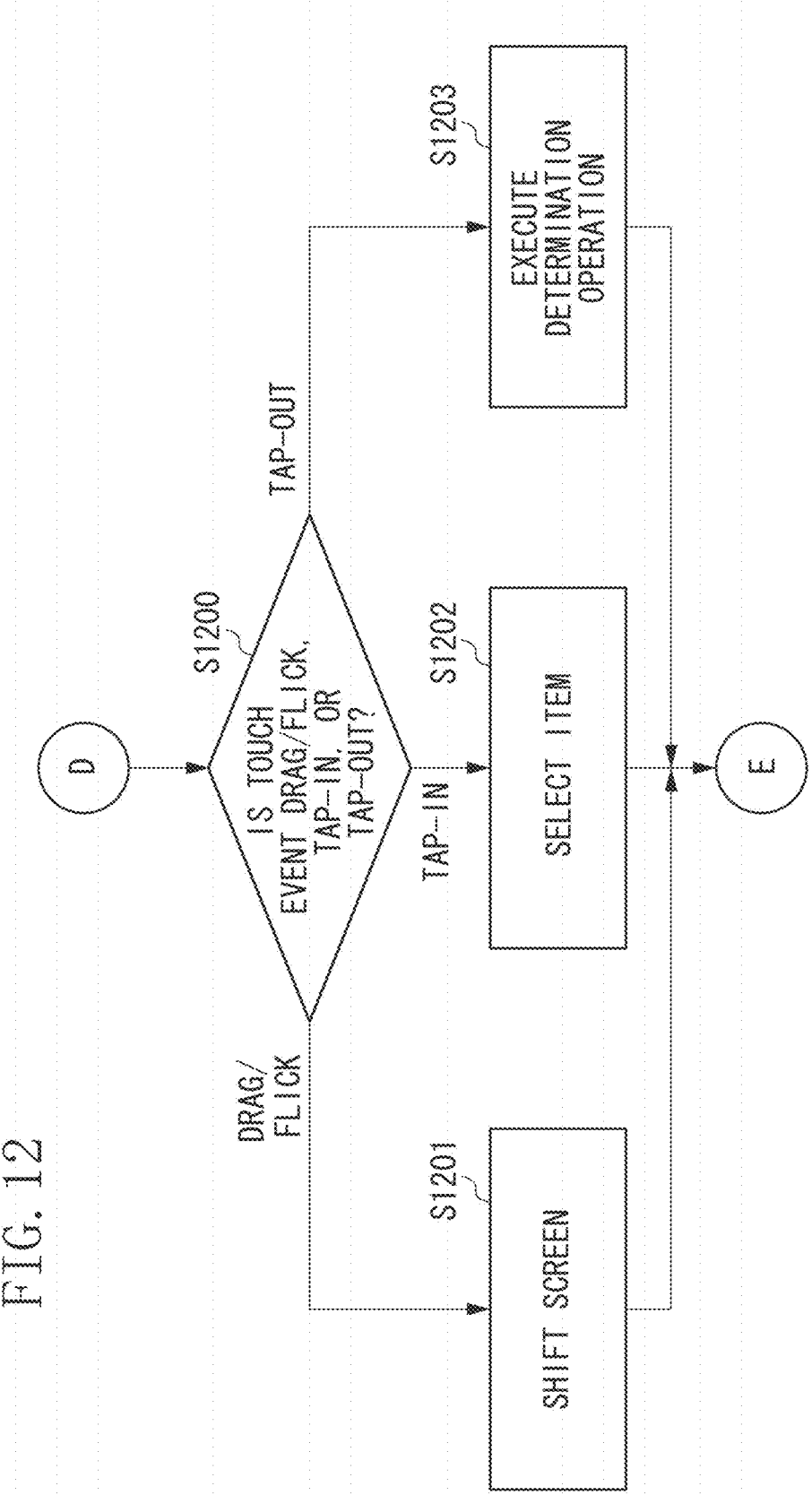
FIG. 12 is a flowchart illustrating shifting processing of a screen.

In a case where the currently-displayed screen is the transmission screen (see FIG. 6) ("TRANSMISSION SCREEN" in step S900), the processing proceeds to step S1200 of processing D in FIG. 12. In step S1200, as illustrated in FIG. 12, the CPU 102 determines the type of touch event according to the determination criterion illustrated in FIG. 3.

In a case where the touch event is the drag event or the flick event ("DRAG/FLICK" in step S1200), the processing proceeds to step S1201. In step S1201, the CPU 102 determines a moving direction of the finger in the drag or the flick and shifts the screen in that direction. The CPU 102 does not execute intermediate depiction while the screen is being shifted. In a case where the touch event is the tap-in event ("TAP-IN" in step S1200), the processing proceeds to step S1202. In step S1202, the CPU 102 causes the item to be displayed on a tap-in position in a selected state, and ends the processing. In a case where the touch event is the tap-out event ("TAP-OUT" in step S1200), the processing proceeds to step S1203. In step S1203, the CPU 102 executes the operation for determining the item displayed on a tap-out position and ends the processing.

In a case where the screen displayed on the touch panel 201 is a screen other than the home screen, the copy screen, the transmission screen, and the preview screen, the CPU 102 executes processing corresponding to any one of the above-described screens.

According to the above-described exemplary embodiment, even if the image forming apparatus has scarce hardware resources, a displayed screen can be efficiently shifted by executing the processing according to the type of screen displayed on the display unit of the touch panel 201 and the type of touch event. With this configuration, for example, the image forming apparatus can efficiently display a screen even if the screen is a preview screen in which rasterization of the image thereof requires time.

According to the present disclosure, because the screen is shifted by a predetermined number according to the content of the operation, the image can be smoothly displayed even if the image forming apparatus has scarce hardware resources.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like. While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control method for an information processing apparatus including a display and a touch panel, the control method comprising:
    displaying, on the display, a preview image of a first image file from among a plurality of image files; and
    detecting a touch operation executed on the touch panel in a state in which the preview image of the first image file is displayed on the display,
    wherein display control is performed such that the preview image displayed on the display is shifted from the preview image of the first image file, which is the preview image being displayed, to a preview image of an image file preceding or succeeding the first image file by N image files (N is 2 or more) in accordance with detection of a flick operation as the touch operation, and
    wherein display control is performed such that the preview image displayed on the display is shifted from the preview image of the first image file, which is the preview image being displayed, to a preview image of an image file preceding or succeeding the first image file by one image file in accordance with detection of a drag operation as the touch operation.

2. The method according to claim 1, wherein the information processing apparatus comprises a scanner that generates image data by reading an image on a document.

3. The method according to claim 1, wherein the information processing apparatus comprises a printer that prints image data.

4. The method according to claim 1, wherein while shifting the preview image displayed on the display from the preview image of the first image file, which is the preview image being displayed, to the preview image of the image file preceding or succeeding the first image file by N image files (N is 2 or more) in accordance with the detection of the flick operation as the touch operation, a preview image of an image file between the first image file corresponding to the preview image being displayed and the image file preceding or succeeding the first image file by N image files (N is 2 or more) is not displayed.

5. The method according to claim 1,
    wherein the plurality of image files is sorted and stored in a memory,
    wherein the preview image displayed on the display is shifted from the preview image of the first image file, which is the preview image being displayed, to the preview image of the image file preceding or succeeding the first image file by N image files (N is 2 or more) as stored in an order of the sorting in accordance with the detection of the flick operation as the touch operation, and
    wherein the preview image displayed on the display is shifted to the preview image of the image file preceding or succeeding the first image file corresponding to the preview image being displayed on the display by one image file as stored in the order of the sorting in accordance with the detection of the drag operation as the touch operation.

6. The method according to claim 1,
    wherein the plurality of image files is sorted and stored in a memory, and
    wherein the preview image displayed on the display is shifted to either one of the preview image of the image file preceding the first image file corresponding to the preview image being displayed by N image files in an order of the sorting and the preview image of the image file succeeding the first image file by N image files in the order of the sorting, in accordance with an operation direction of the flick operation detected as the touch operation.

7. The method according to claim 1,
    wherein the plurality of image files is sorted and stored in a memory, and
    wherein the preview image displayed on the display is shifted to either one of the preview image of the image file preceding the first image file corresponding to the preview image being displayed by one image file in an order of the sorting and the preview image of the image file succeeding the first image file by one image file in the order of the sorting, in accordance with an operation direction of the drag operation detected as the touch operation.

8. The method according to claim 1, wherein the N (N is 2 or more) is a constant value regardless of intensity of the flick operation detected as the touch operation.

9. The method according to claim 1,
    wherein the plurality of image files is sorted and stored in a memory, and
    wherein, in a case where a number of stored image files preceding or succeeding the first image file corresponding to the preview image being displayed on the display in the order of the sorting is smaller than N, the preview image displayed on the display is shifted to a preview image corresponding to an image file stored first or last in the storage portion in accordance with the detection of the flick operation as the touch operation.

10. The method according to claim 1, wherein control is performed such that, in accordance with detection of a flick operation as the touch operation on the display on which an image different from the preview image is displayed, images between the image displayed on the display and an image to which the image displayed on the display is to be shifted are displayed as a series of images, and in accordance the detection of the flick operation as the touch operation on the display on which the preview image is displayed, images between the preview image displayed on the display and a preview image to which the preview image displayed on the display is to be shifted are not displayed.

11. An information processing apparatus comprising:
a display;
a touch panel;
a memory that stores a set of instructions; and
at least one processor that executes the instructions to
display, on the display, a preview image of a first image file from among a plurality of image files;
detect a touch operation executed on the touch panel in a state in which the preview image of the first image file is displayed on the display,
wherein display control is performed such that the preview image displayed on the display is shifted from the preview image of the first image file, which is the preview image being displayed, to a preview image of an image file preceding or succeeding the first image file by N image files (N is 2 or more) in accordance with detection of a flick operation as the touch operation, and
wherein display control is performed such that the preview image displayed on the display is shifted from the preview image of the first image file, which is the preview image being displayed, to a preview image of an image file preceding or succeeding the first image file by one image file in accordance with detection of a drag operation as the touch operation.

12. A non-transitory computer readable storage medium storing a program for causing a computer to execute a control method for an information processing apparatus including a display and a touch panel, the control method comprising:
displaying, on the display, a preview image of a first image file from among a plurality of image files;
detecting a touch operation executed on the touch panel in a state in which the preview image of the first image file is displayed on the display,
wherein display control is performed such that the preview image displayed on the display is shifted from the preview image of the first image file, which is the preview image being displayed, to a preview image of an image file preceding or succeeding the first image file by N image files (N is 2 or more) in accordance with detection of a flick operation as the touch operation, and
wherein display control is performed such that the preview image displayed on the display is shifted from the preview image of the first image file, which is the preview image being displayed, to a preview image of an image file preceding or succeeding the first image file by one image file in accordance with detection of a drag operation as the touch operation.

* * * * *